Nov. 7, 1944.  R. W. COLLIER  2,362,246
VEHICLE TRACTION ATTACHMENT
Filed Dec. 1, 1942  2 Sheets-Sheet 1
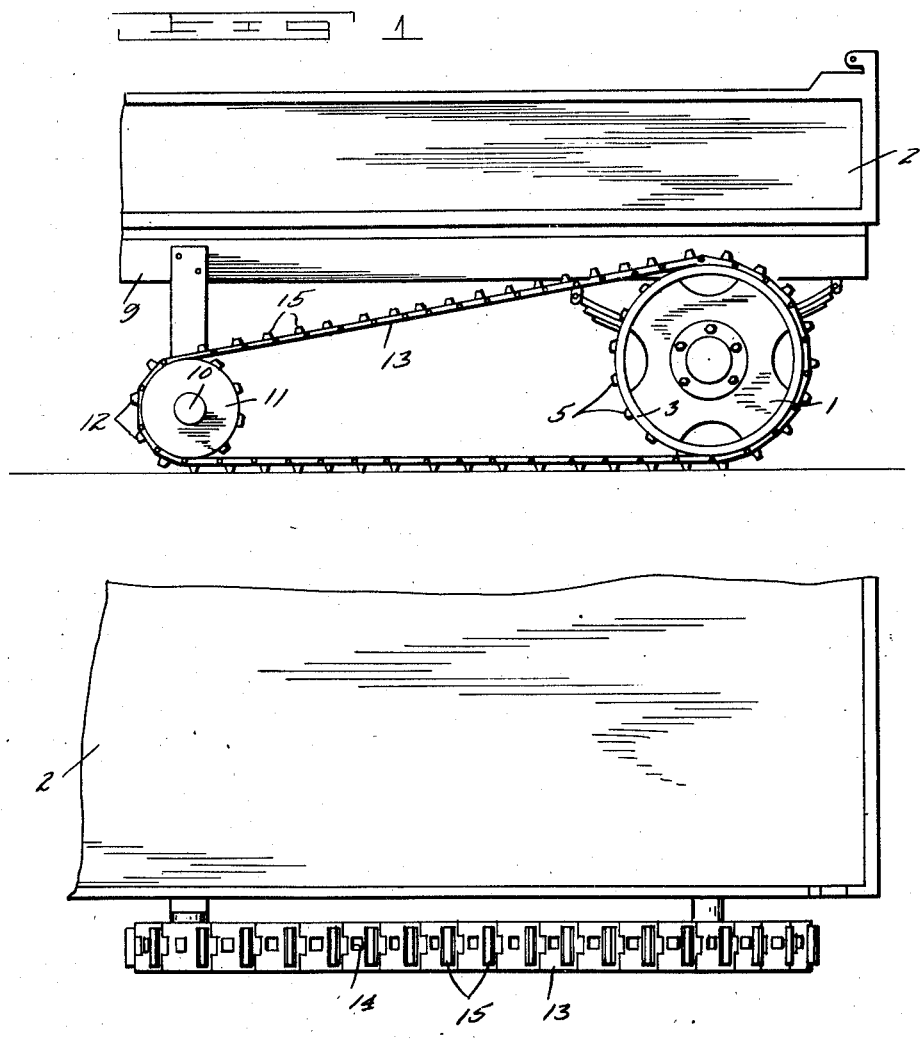
Inventor
Robert W. Collier
By Clarence A. O'Brien
and Harvey B. Jacobson
Attorneys

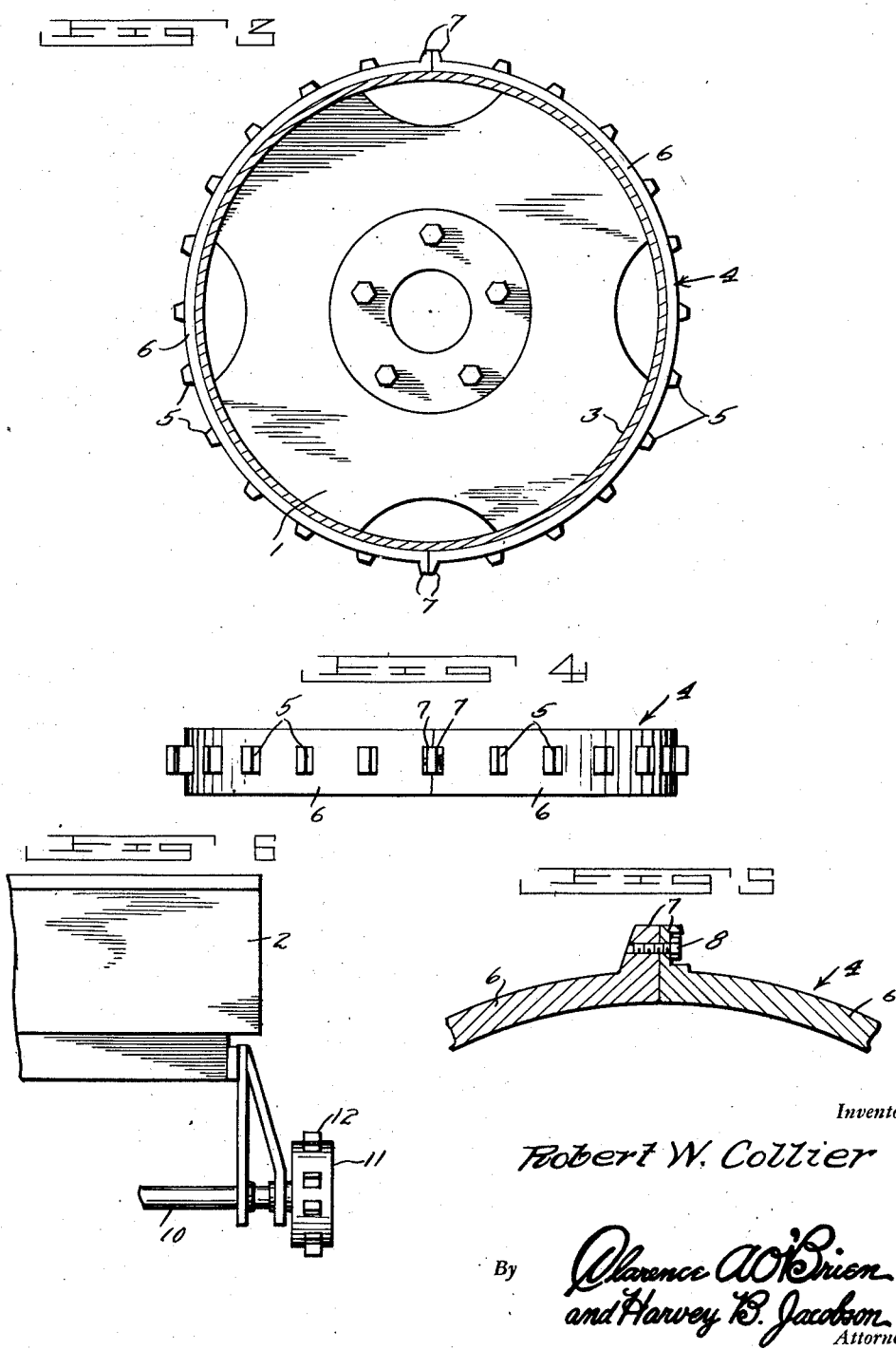

Patented Nov. 7, 1944

2,362,246

UNITED STATES PATENT OFFICE 2,362,246

VEHICLE TRACTION ATTACHMENT

Robert W. Collier, Jal, N. Mex.

Application December 1, 1942, Serial No. 467,519

1 Claim. (Cl. 305—3)

The present invention relates to new and useful improvements in traction attachments for tractors, trucks, etc., and has for its primary object to provide, in a manner as hereinafter set forth, novel means for converting vehicles of this character to semi-crawlers.

Another very important object of the invention is to provide a traction attachment of the aforementioned character which is adapted to be expeditiously installed on the vehicle without the necessity of making material structural alterations therein.

Other objects of the invention are to provide a vehicle traction attachment of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein—

Figure 1 is a view in side elevation of the rear portion of a vehicle equipped with a traction attachment constructed in accordance with the present invention.

Figure 2 is a top plan view thereof.

Figure 3 is a view in side elevation of the vehicle wheel with the rim thereof in section, showing the sectional ring constituting a part of the invention thereon.

Figure 4 is a plan view of the removable ring.

Figure 5 is a detail view in vertical section, showing the joint structure which connects the removable ring sections.

Figure 6 is a view in front elevation of the idler pulley or wheel.

Referring now to the drawings in detail, it will be seen that reference numeral 1 designates one of the rear wheels of a vehicle 2, said wheel including a suitable rim 3.

Removably mounted on the rim 3 is a ring 4 comprising suitable lugs 5. The ring 4 further includes complemental half sections 6 having abutting lugs 7 on their ends. Countersunk bolts 8 are provided in the lugs 7 for detachably securing the ring sections 6 together on the wheel rim 3. Of course, both rear wheels of the vehicle 2 are to be equipped with rings 4. Mounted transversely beneath the frame 9 of the vehicle 2, forwardly of the rear wheels 1 thereof, is a shaft 10. Comparatively small wheels 11 are journaled on the end portions of the shaft 10 in alignment with the wheels 1. The wheels 11 comprise suitable lugs 12.

Endless tracks 13 are trained around the wheels 1 and 11, the links or sections of said tracks having openings 14 therein which accommodate the lugs 5 and 12. Thus, the endless tracks 13 are connected to the drive wheels 1 of the vehicle 2 for actuation thereby.

The endless tracks 13 further include suitable traction lugs 15.

It is thought that the manner in which the invention functions will be readily apparent from a consideration of the foregoing. The rings 6 are mounted on the rear wheels of the vehicle, the wheels or pulleys 11 are installed and the endless tracks 13 are then mounted on said wheels. Of course, the wheels 11 support the forward end portions of the tracks 13. In addition to positively connecting the endless tracks 13 to the rear wheels 1 of the vehicle, the lugs 5 provide added traction for said rear wheels. The construction and arrangement is such that the attachment may be expeditiously removed to permit the usual tires to be remounted on the wheels 1, if desired. The openings 14 in the endless tracks 13 also accommodate the connecting lugs 7 of the ring sections 6.

It is believed that the many advantages of a vehicle traction attachment constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

Having described the invention, what is claimed as new is:

A traction attachment for vehicles including drive wheels having rims thereon, comprising rings removably mounted on the rims, said rings including complemental half sections having circumferentially spaced lugs thereon, abutting lugs on the ends of said sections, having aligned threaded openings, one of said last-named lugs having a recess therein, and a bolt threaded in the openings of each pair of abutting lugs with the head of the bolt received in said recess.

ROBERT W. COLLIER.